Sept. 13, 1966  A. R. SPOHR  3,272,998
VIBRATOR MOTOR FOR ELECTRIC SHAVER
Original Filed June 7, 1963  4 Sheets-Sheet 1

INVENTOR.
ALBERT R. SPOHR
BY
George R. Clark
Attorney

Sept. 13, 1966    A. R. SPOHR    3,272,998
VIBRATOR MOTOR FOR ELECTRIC SHAVER
Original Filed June 7, 1963    4 Sheets-Sheet 2

INVENTOR.
ALBERT R. SPOHR
BY
George R. Clark
Attorney.

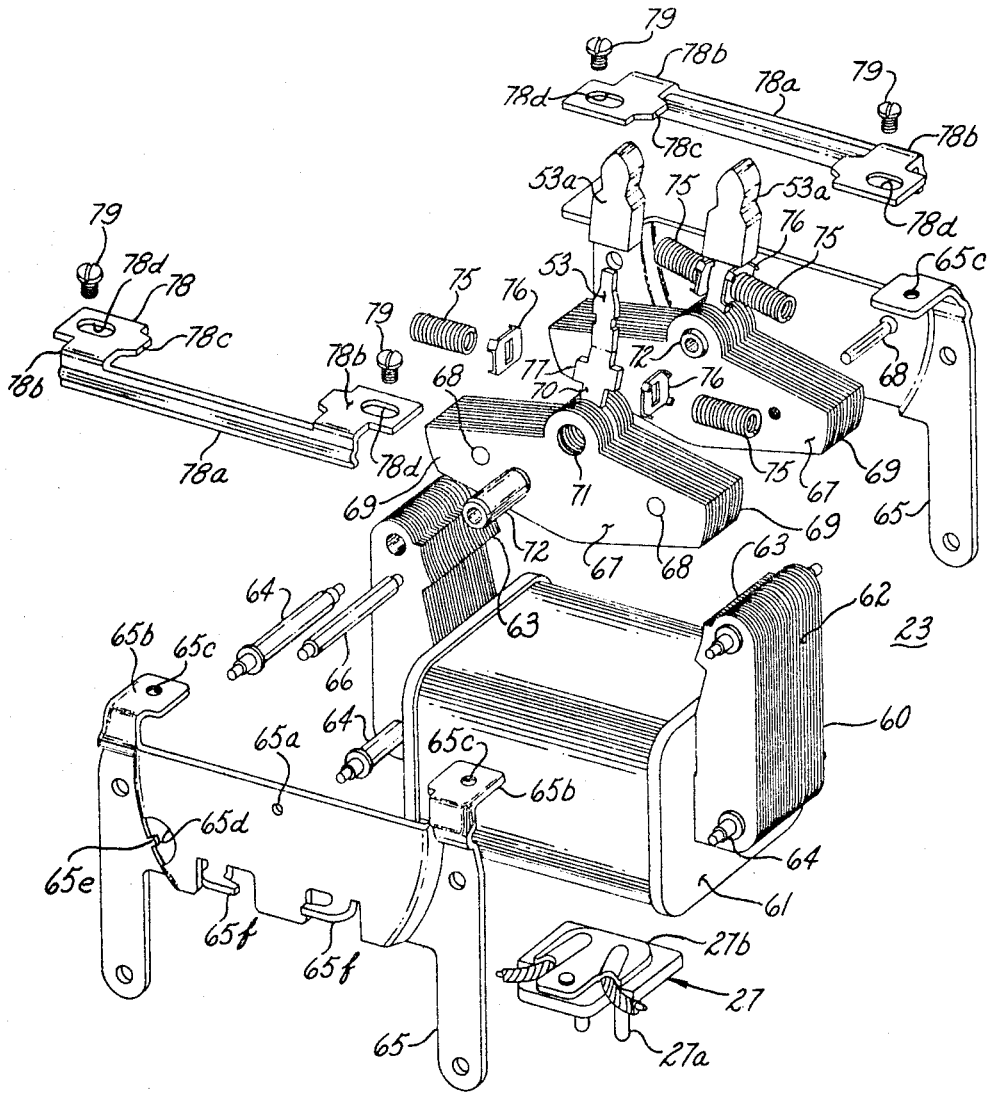
Fig.-7-

Sept. 13, 1966 A. R. SPOHR 3,272,998
VIBRATOR MOTOR FOR ELECTRIC SHAVER
Original Filed June 7, 1963 4 Sheets-Sheet 4
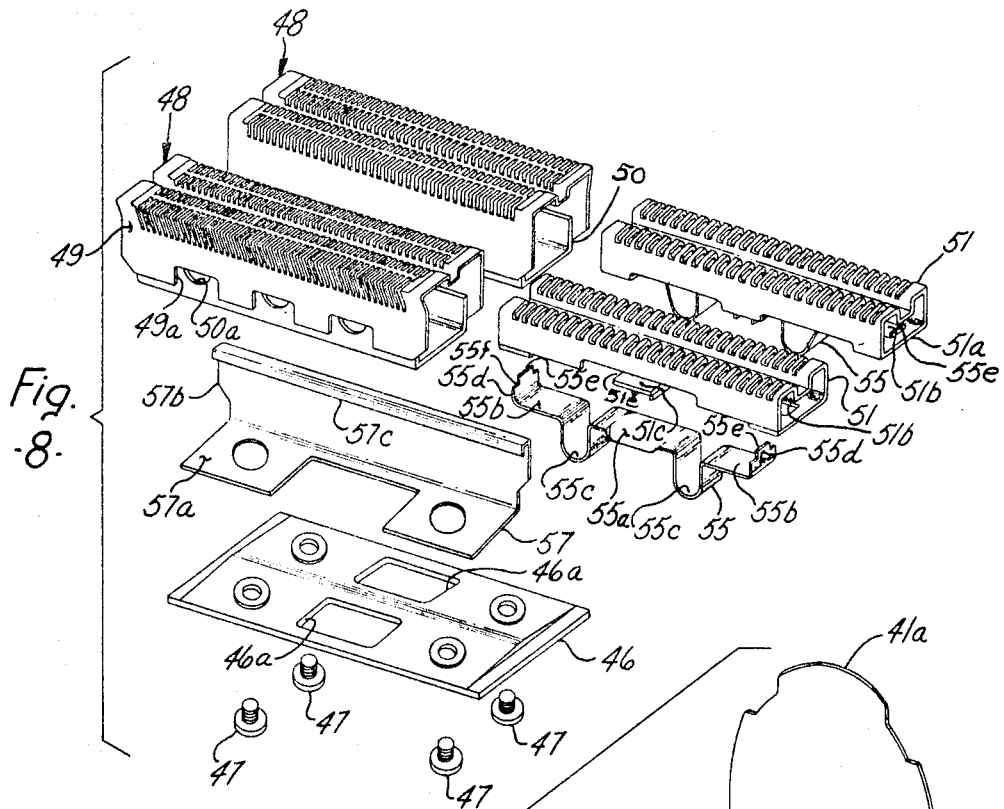
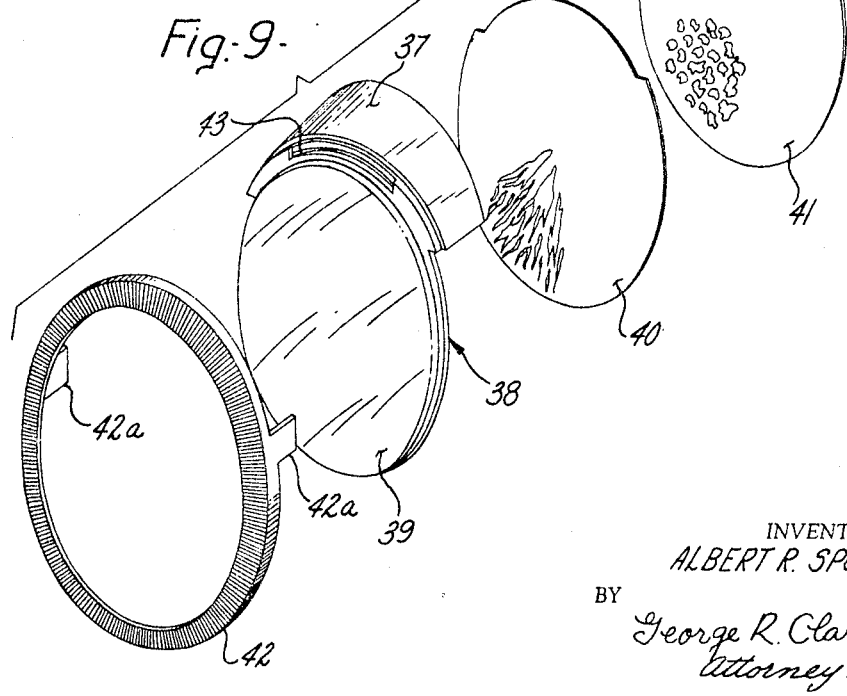
INVENTOR.
ALBERT R. SPOHR
BY George R. Clark
Attorney

United States Patent Office 3,272,998
Patented Sept. 13, 1966

3,272,998
VIBRATOR MOTOR FOR ELECTRIC SHAVER
Albert R. Spohr, Park Ridge, Ill., assignor to Sunbeam Corporation, Chicago, Ill., a corporation of Illinois
Original application June 7, 1963, Ser. No. 286,248, now Patent No. 3,218,708, dated Nov. 23, 1965. Divided and this application June 21, 1965, Ser. No. 465,472
4 Claims. (Cl. 310—22)

This is a division of application Serial No. 286,248, now Patent No. 3,218,708, filed June 7, 1963.

The present invention relates to an electrically operated dry shaver and more particularly to a shaver designed for use by women.

The market for dry shavers designed particularly for women has increased tremendously in the last ten years. With the introduction into the market of the dry shaver disclosed and claimed in Jepson et al. Patent No. 3,072,809, the women of this country began to appreciate the advantages associated with a dry shaver for hair removal as compared to blade razors, depilatories and other means which had formerly been used. As women have become more familiar with dry shavers, they have become more demanding in the performance to be obtained from women's shavers. As a consequence, they have come to expect the same shaving performance from a woman's shaver as had formerly been available only in the higher priced men's shavers. Women have also come to expect that their dry shavers be adapted to their particular conditions of use and that their shavers not be simply men's shavers modified in styling aspects.

The manner in which a woman uses a shaver requires that it be lighter in weight and easier to manipulate than a man's shaver which is used only over the limited area of the face and neck. In addition, the head of a dry shaver for women must of necessity be considerably smaller so that it may be conveniently used in the underarm area. Since the dry shaver for women is only used once or twice a week, there has been a great reluctance to pay as much for one of these shavers as for a man's shaver. This demand for lightweight, high performance and low cost has stimulated very intense competition in the design, manufacturing and marketing of shavers for women. To maintain the cost at a minimum, it has become accepted practice to use a vibrator type motor in dry shavers for women whereas most men's shavers are powered by rotary armature type reluctance motors or commutator type motors. Many women have been dissatisfied with the vibrator type motor because there is inherently more noticeable vibration in a small device powered by an oscillating armature vibrator as compared to the same device powered by a rotary armature type of motor. It would be desirable, therefore, to retain the cost advantages of the vibrator type motor while at the same time eliminating the vibration effects normally associated therewith.

Another problem encountered in the design of a dry shaver for women relates to the demand for a very attractive and ornamental appearance while, at the same time, maintaining cost at a minimum. A further problem associated with electric dry shavers for women is that of illuminating the area of the body to be shaved. While a man normally shaves in front of a well lighted mirror in the bathroom, it is conventional for women to shave their legs or underarms in the bedroom or in the bathroom where the light may not be adequate. There is a need, therefore, for illuminating means associated with the shaver which would overcome the problem of insufficient light in the area where a woman might have to shave herself. Again, because of the fierce price competition in this field, the illumination feature must be provided at a minimum cost and must be attractively integrated with the design of a shaver.

In both men's and women's dry shavers, many arrangements have been provided for biasing the cutter against the fixed comb. The objective in the design of such cutter biasing means has always been to obtain a fixed and uniform biasing pressure at a minimum cost and with as few parts as possible. It is also regarded as a requirement that the cutter, the biasing means and the comb remain assembled as a unitary structure when the shaving head is removed as a unit from the shaver for cleaning purposes. In addition, the cutter, the biasing means and the comb should be associated together in a simple manner so they may be easily disassembled for cleaning purposes.

Accordingly, it is an object of the present invention to provide a new and improved shaver for women which has the desirable features set forth above.

It is another object of the present invention to provide an improved dry shaver utilizing a vibrator type motor which produces a minimum of vibration effects in the hand of the user.

It is another object of the present invention to provide a dry shaver having an improved vibrator type motor with dual armatures oscillating in opposite directions.

It is another object of the present invention to provide an improved dry shaver having two reciprocating type shaving heads which are driven in opposite directions by means of a dual armature vibrator motor.

It is a further object of the present invention to provide a dry shaver having an improved dual armature motor with means for adjusting the rest positions of the armatures to assure equal power delivery to both armatures.

Still another object of the present invention is to provide an improved head for a dry shaver having a simplified cutter biasing means.

It is another object of the present invention to provide an improved cutting head for a dry shaver in which a simplified cutter biasing spring is employed, which spring retains the cutter within the comb and is readily detachable from the comb and cutter.

A further object of the present invention is to provide an improved housing for a dry shaver including a combined light diffusing lens and decorative medallion.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 7 is an exploded perspective view of the motor of the dry shaver of the present invention;

FIG. 8 is an exploded perspective view of the head assembly having the two shaving heads of the present invention; and FIG. 9 is an enlarged exploded perspective view of the combined light lens and decorative medallion of the present invention.

Figures 1, 2, 3:
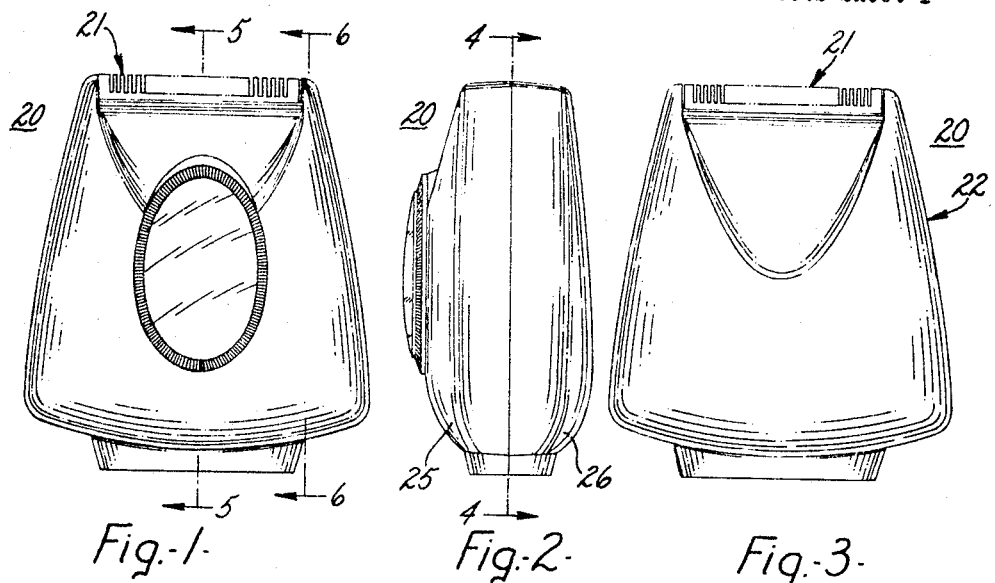
FIG. 1 is a side elevational view of a dry shaver embodying the present invention.
FIG. 2 is a side elevational view of the dry shaver shown in FIG. 1.
FIG. 3 is a rear elevational view of the dry shaver of FIG. 1.

Briefly, the present invention is concerned with a dry shaver for women which utilizes a vibrator type motor having two armatures oscillating in opposite directions to drive two cutter heads with a minimum amount of external vibration. The armatures are arranged in parallel in the magnetic circuit including the motor field thereby necessitating very accurate positioning of the armatures to assure equal power delivery to both of the cutting heads. Adjustable means are provided for the armature biasing springs to permit easy adjustment of the desired rest positions of the armatures with respect to the motor field. The shaver includes a head assembly having two spaced shaving heads with tubular combs enclosing cutters mounted for reciprocating movement therein. The cutters are driven directly by an arm extending from each of the armatures with a simple formed spring engaged by the end of the driving lever to bias the cutter against the comb. The biasing spring is retained in mounted position on the cutter by the resilience of the spring acting against the ends of the slots in which it is mounted. The motor housing is formed with an opening through which light from a bulb mounted on the motor itself may be transmitted to illuminate the area adjacent the shaving head. The light diffusing lens which is positioned across the housing opening is formed integrally with a plastic medallion member mounted on the outside of the shaver housing. A multicolored transparent film and a roughened foil member are combined with the clear plastic member to provide a rich, expensive looking medallion member at a very low cost.

Referring now to the drawings, there is illustrated an electric dry shaver generally designated by the reference numeral 20. Essentially the dry shaver 20 comprises a cutting head assembly 21 mounted along one edge of a housing 22 which encloses a vibrator type motor generally designated by reference numeral 23.

As is evident from FIGS. 1, 2 and 3, the housing 22 is somewhat flat as seen in the side view and more or less trapezoidal in shape when considering the front or rear profile thereof. The housing is narrowed adjacent the cutting head assembly 21 so that it provides as little obstruction as possible to the use of the cutting head in the underarm area. This requirement for easy manipulation of the shaving head, as well as the need for a casing shape which may be easily held in the hand, are the prime considerations involved in the design of the housing 22.

Figure 4:
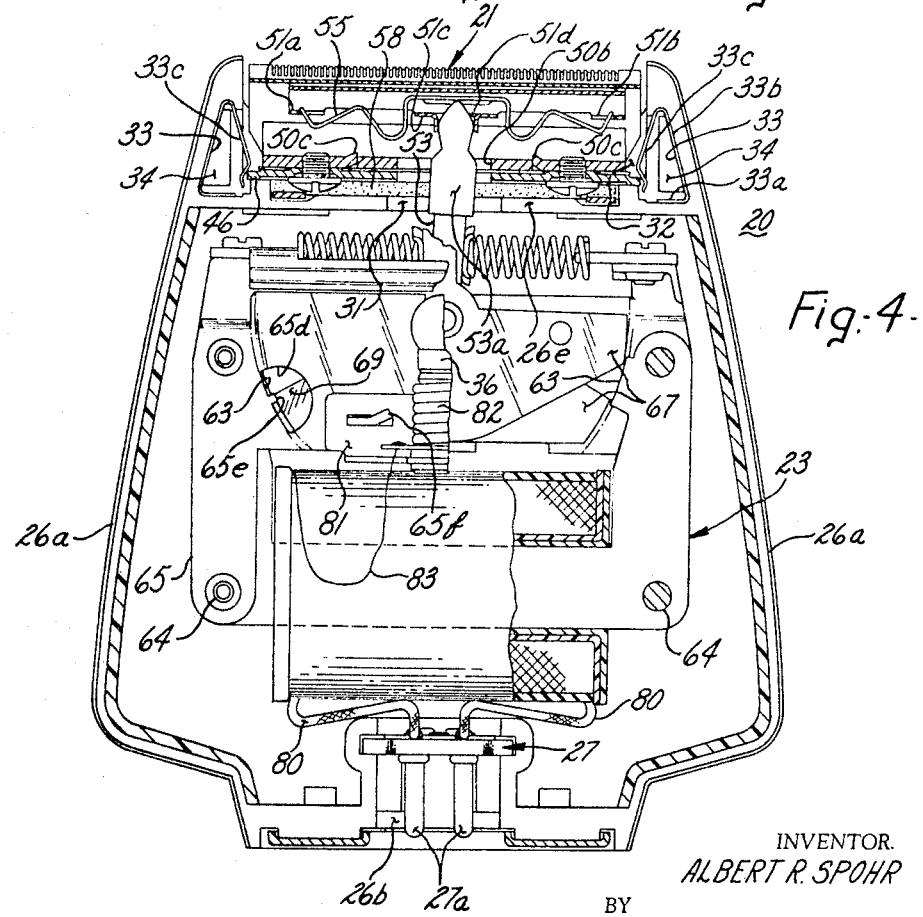
FIG. 4 is an enlarged sectional view of the housing taken substantially along line 4—4 of FIG. 2 but with portions of the motor shown in full lines.
Figure 6:
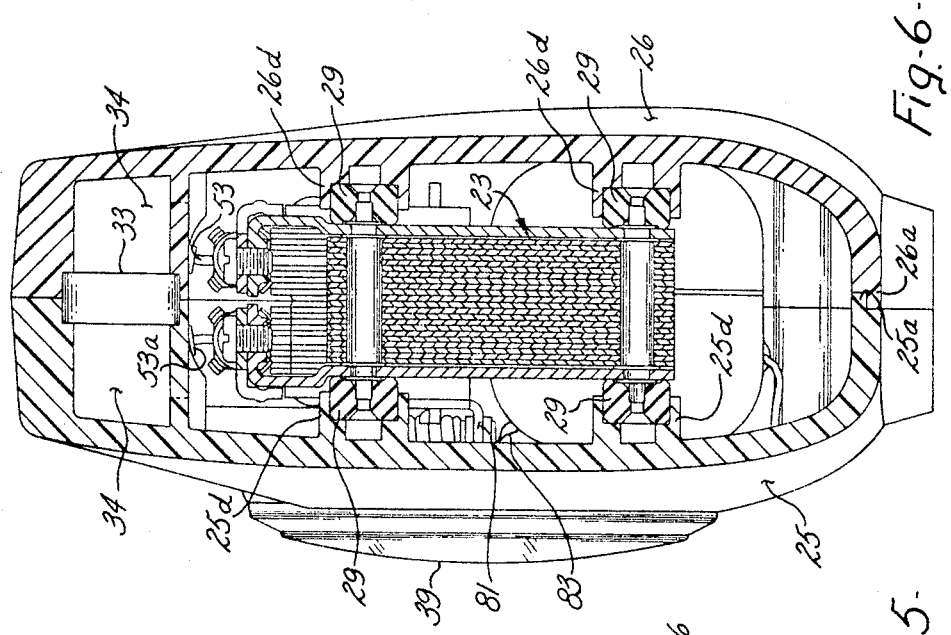
FIG. 6 is an enlarged sectional view taken on line 6—6 of FIG. 1 with the shaving heads removed for simplicity.

The housing 22 is a two-piece casing comprising a front housing portion or half 25 and a rear housing portion or half 26. The housing halves 25 and 26 are somewhat cup or dish-shaped having portions of their side walls formed with mating lips 25a and 26a, respectively, as are best shown in FIGS. 4 and 6. The lip 25a on the walls of the front housing half is positioned inside of the lip 26a formed on the rear housing half 26. These mating lips assure a smooth, tight junction of the housing portions along their parting line and assure that they will be assembled in proper alignment. The housing halves 25 and 26 may be held together by any suitable assembly means such as screws or resilient clamping members.

For the purpose of permitting a power connection to be made to the motor 23 contained within the housing 22, complementary notches 25b and 26b are formed in the lower walls of the housing halves 25 and 26, respectively. Extending inwardly from the notches 25b and 26b are integrally formed wall portions 25c and 26c on the housing portions 25 and 26, respectively, which wall portions receive and support an electrical terminal pin assembly 27. The terminal pin assembly 27 is trapped by the wall portions 25c and 26c and held in assembled position within the housing 22 with a pair of terminal pins 27a mounted in spaced parallel relationship within the opening formed by the complementary notches 25b and 26b.

To support the motor within the housing 22, there are four integrally formed bosses 25d and 26d provided on each of the housing halves 25 and 26, respectively. Two of each of these integral bosses are shown in FIG. 6. The bosses 25d and 26d are provided with inwardly directed recesses within which are received rubber bushings 29 which engage and resiliently support the motor 23 in the same manner as the bushings disclosed in Jepson et al. Patent No. 3,072,809.

The upper end of the housing 22 is closed by a pair of walls 25e and 26e which extend transversely of the housing from the front and rear housing halves 25 and 26, respectively. The walls 25e and 26e are interrupted toward the center of the casing to provide a transversely extending opening 31 through which the driving connection between the motor 22 and the cutting head assembly 21 may be effected. The walls 25e and 26e are spaced downwardly from the top of the shaver housing 22 to provide an upwardly facing recess 32 within which the cutting head assembly 21 may be mounted. For the purpose of mounting the cutting head assembly 21 therein, a pair of head retaining springs 33 are mounted within spring recesses 34 formed by complementary pockets in the housing halves 25 and 26. Each spring 33 is substantially triangular in shape formed with a base leg 33a, an upright leg 33b and a latching portion 33c. The base leg 33a and upright leg 33b exert pressure on the walls of the spring recess 34 so that, even when the housing halves are disassembled, the springs 33 remain assembled to one of the two housing halves. The spring recesses 34 are open on the side toward the cutting head assembly 21 thereby permitting the latching portion 33c to engage the cutting head assembly and detachably retain it in position in the recess 32 of the housing 22.

Supported on the motor 23 there is an electric light bulb 36 which is designed to provide illumination for the area being shaved by the dry shaver 20. To permit the light produced by the bulb 36 to shine upwardly toward the cutting head assembly 21, the front housing portion 25 is formed with a light or lens opening 25f. The opening 25f is interconnected with a second opening 25g which extends downwardly from opening 25f and is solely for clearance purposes. Inasmuch as it is difficult to maintain the dry shaver 20 thin enough so that it may be suitably gripped by the small hand of a woman, the housing half 25 is cut away at 25g so that the light 36 may be positioned as close to the surface of the shaver housing 22 as possible.

The light or lens opening 25f is covered by a light diffusing member or lens 37 which may have a cylindrical curvature. The lens 37 may comprise a simple clear plastic member molded with a roughened surface so that it will diffuse the light produced by the bulb within the shaver housing. To simplify the structure of the shaver as much as possible, the lens 37 is formed as a part of a combined lens and medallion member 38. The combined member 38 includes an oval disc or medallion cover 39 of clear plastic with the lens 37 extending inwardly from the upper edge thereof. To complete the medallion, there is a transparent plastic film 40 which is oval in shape and mounts directly against the medallion cover 39. The transparent film 40 may be made of acetate with any suitable design or configuration. It is contemplated, however, that a delicate translucent multicolored pattern should be printed on this film. Inwardly of the film 40, there is positioned a reflector 41 which is made of a highly reflective opaque material which has been formed with a coarse, uneven surface having many angled reflecting surfaces. The angled reflecting surfaces of the reflector 41 combined with the delicate translucent, colored pattern of the transparent film 40 to create the illusion of an expensive jeweled medallion. Actually the medallion cover 39, the printed transparent film 40 and the reflector 41 may be fabricated for only a few cents. The resulting product is very rich and expensive looking. While it is well known to place colored patterns on the reverse side of transparent plastic members to create interesting visual effects, none of these products are either as inexpensive or appealing in appearance as in the medallion described above.

The medallion is framed by an oval bezel 42 which also serves as a retaining member. The bezel is formed with three retaining tabs 42a which extend through slots 25h in the housing portion 25 and are crimped over on their inner ends. With the tabs 42a crimped over against the inside wall of the housing half 25, the combined lens and medallion member 38 is retained against the outer wall of the shaver with the transparent film 40 and the reflector 41 clamped beneath the oval medallion cover 39.

At the upper edge of the oval disc 39, there is provided an annular slot 43 in the member 38. The upper edge of the reflector 41 is formed with a key portion 41a which is received within the slot 43 and prevents light from the lens 37 from being conducted into medallion cover 39. This provides a simple means of eliminating the objectionable light leakage which might take place because of the integral structure of lens 37 and cover 39. It should be appreciated that the reflector 41 may consist of a roughened plastic member with the front surface thereof painted with a highly reflecting material. Alternatively the reflector 41 may consist of an aluminum foil member which is merely embossed to provide the roughened surface.

The motor 23, which is provided to drive the cutting head assembly 21, is a resonant vibrator type motor of generally the same type disclosed in Jepson et al. Patent No. 3,072,809. In the shaver of the Jepson et al. patent, a single oscillating armature was employed to drive the cutting head. In the present shaver, the cutting head assembly 21 includes two individual shaving heads 45 which are driven by separate armatures in a manner to be described below. The shaving heads 45 are assembled together to form the head assembly 21 by means of base plate 46 to which the heads are secured by means of screws 47. The base plate 46 is deformed so that the head supporting surfaces thereof are angled slightly outwardly as is evident from FIG. 8. Clearance openings 46a are provided to permit driving connection between the motor and each of the shaving heads 45.

Each of the heads 45 includes a tubular comb 48 which is made up of an inverted, channel-shaped, slotted comb plate 49 and a channel-shaped base member 50 secured thereto by welding. The comb plate 49 is notched at 49a in line with notches 50a on the channel-shaped base member 50. These notches 49a and 50a are positioned between the spaced welded portions to minimize deformamation in the comb 48 when it is heat treated. Received within the tubular combs 48 are cutters or cutting members 51 mounted for reciprocation in shearing engagement with the teeth on the slotted comb 48. Each of the cutters 51 is an elongated tubular member with teeth formed along the upper side thereof and is made of one piece of metal which is formed to a somewhat box shape. At either end of each cutter 51, there is a transversely extending spring support 51a. The inner edge of each of the spring supports 51a is formed with an inwardly extending open slot 51b. Toward the center of the cutter 51 there is a transversely extending drive lug 51c by means of which the driving connection between the motor and the cutter 51 is effected. The drive lug 51c has a central opening 51d which is formed with the dges thereof extending downwardly to provide surfaces for driving engagement with the cutter 51.

Extending upwardly from the motor 23 is a pair of drive arms 53. The drive arms 53 include molded nylon caps 53a which assure a silent driving engagement with the cutters as well as to insulate electrically the motor from the shaving heads 45. The nylon caps on the drive arms 53 extend through the openings 51d in the drive lugs 51c to drivingly interrelate the motor and the shaving heads 45.

To bias the cutters 51 into shearing engagement with the slotted portion of the combs 48, springs 55 are provided. Each spring 55 is elongated having a central or driving portion 55a interconnected to end portions 55b by means of loops or U-shaped portions 55c. Each biasing spring 55 is formed with turned up ends 55d which extend substantially at right angles to the end portions 55b. The terminations of the ends 55d are formed with mounting projections 55e which are of reduced width as compared to the remainder of the spring 55. Immediately adjacent the mounting projections 55e are shoulders 55f extending outwardly. To assemble the spring 55 to the cutter 51, it is necessary to insert the mounting projections 55e on the ends of the biasing springs 55 into the slots 51b formed in the spring supports 51a. The mounting projection 55e is slightly smaller in width than the slot 51b so that it slides readily therein with the shoulders 55f adjacent the mounting projection 55e in engagement with the spring support 51a. The spring 55 is dimensioned so that some lengthwise compression of the spring is necessary to fit the mounting projection 55e into the slots 51b.

The spring 55 is assembled to the cutter 51 with the central portion 55a received within the interior of the cutter 51 and above the drive lug 51c. As may be best seen in FIG. 8, a clearance opening 51e is provided between one end of the drive lug 51c and the side of the cutter 51. Thus, to assemble the spring 55 to the cutter, the mounting projection 55e on one end of the spring is inserted into one of the slots 51b. The spring is then pivoted in from the side so that the central portion 55a of the spring moves in through clearance opening 51e to a positon above the driving lug 51c. The other end of the spring is then pushed inwardly compressing the spring 55 until the second mounting projection 55e may be inserted into a slot 51b. With the spring 55 compressed lengthwise and biased upwardly at its mid-point by the drive lug 51c, the spring is firmly and securely retained in assembled relation with respect to the cutter 51. The drive lug 51c serves as a stop means preventing downward deflection of the central portion 55a by the lengthwise compressive force exerted on the spring 55. This provides a simple and effective means of detachably supporting the biasing spring with respect to the cutter.

As may be best seen in FIG. 4, the end of the drive arm cap 53a engages the central or driving portion of the spring 55 thereby biasing the cutter 51 into sharing engagement with the comb 48. It should be noted that the channel-shaped base member 50 of the comb 48 is formed with a clearance opening 50b which is of the same size and aligned with the opening 46a formed in the base plate 46 and through which the drive arm 53 extends. Immediately outwardly from the clearance opening 50b, the channel-shaped base member 50 is formed with sheared projections 50c which serve to retain and locate the cutter within the tubular comb 48 when the cutting head assembly 21 is detached from the shaver housing. Upon removal of the cutting head assembly 21 from the shaver housing, the drive arm is disengaged from the biasing springs 55 allowing them to move downwardly into engagement with the drive lug 51c. In such position, the loops or U-shaped portions 55c of the biasing springs 55 are in close proximity to or in sliding engagement with the inner face of the base member 50. Through the provision of the sheared projections 50c, the cutter 51 is retained in a central position within the comb 48 and has no tendency to slide lengthwise out of the tubular comb.

Figure 5:
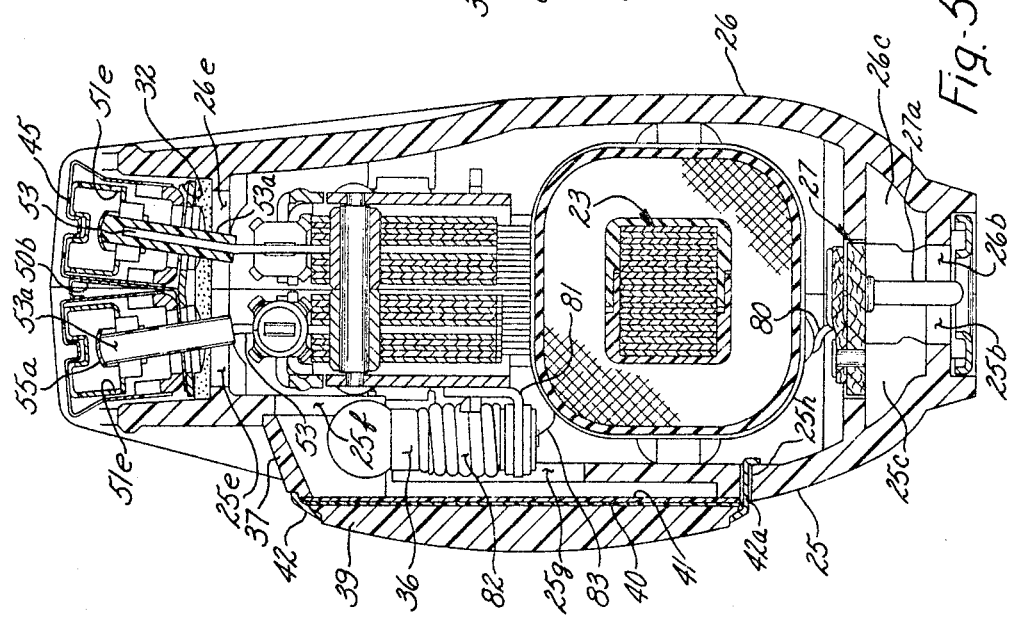
FIG. 5 is an enlarged sectional view taken on line 5—5 of FIG. 1.

In considering the manner in which the nylon cap 53a on the drive arm 53 engages the cutter biasing spring 55, reference should be made to the sectional view of the shaving heads 45 as shown in FIG. 5. It should be noted that the central or driving portions 55a of the biasing springs 55 are curved transversely to the length of the spring to provide a cylindrical surface for engagement with the ends of the drive arms 53 which are rounded to conform to the curvature of the driving portions 55a. The curved engaging surfaces of the drive arm 53 and the biasing spring 55 are important to assure proper engagement between these two parts. If it were possible to mount the biasing spring 55 so that it would be perfectly perpendicular to the drive arm 55, such curved engaging portions would be unnecessary. Considering the angled disposition of the drive arms 53 and the tolerance build-up in the shaving head parts, it is almost impossible to obtain this perpendicular relationship. If the end of the drive arm were engaging the spring 55 at an angle to the perpendicular, a wedging action would result which would tend to displace sidewardly the central portion of the spring with respect to the cutter. With the rounded engaging surfaces, however, the force may be transmitted from the drive arm to the cutter spring without any lateral displacing forces in spite of some degree of misalignment between the arm and the spring.

When the shaving heads 45 are assembled to the base plate 46, their inclined position with respect to the horizontal results in a wedge-shaped space existing between the inner walls of the two shaving heads 45. To fill this space between the heads, an L-shaped spacer 57 is employed. The spacer 57 includes a support portion 57a which is clamped between one of the shaving heads 45 and the base plate 46. Extending upwardly from one edge of the support portion 57a is an upright portion 57b which is positioned between the two shaving heads and terminates in a lengthwise extending rib 57c which completely fills the space between the two shaving heads 45.

It should be noted that the head retaining springs 33 hold the cutting head assembly 21 in position through the engagement of the ends of the base plate 46 by the latching portions 33c as is best shown in FIG. 4. To remove the cutting head assembly 21 from its assembled position on the housing 22, it is merely gripped between the fingers and drawn upwardly causing the base plate 46 to deflect the latching portions 33c out of engagement with the base plate 46. In order to prevent hair clippings from falling from the shaving heads 45 through the aligned openings 50b, 46a and housing opening 31 into the interior of the housing, it has been found to be desirable to place a pad 58 of polyurethane foam between the base plate 46 and the housing wall defined by the walls 25e and 26e of the two housing halves. The foam pad 58 is suitably apertured to permit the drive arms 53 to extend therethrough.

As was explained above, the motor 23 best shown in FIG. 27 is mounted within the housing 22 by means of rubber bushings 29 which resiliently support the motor therein. The motor 23 includes a generally U-shaped laminated field 60 having a coil 61 mounted on the bight portion thereof and upwardly extending legs 62 formed with opposed pole faces 63 provided thereon. The laminated field 60 is assembly by means of pins 64 which are staked over against the outermost laminations.

Assembled to the outer faces of the laminated field 60 are a pair of frame members 65. The frame members 65 are assembled to the field by a second staking operation on the exposed ends of the assembly pins 64. Each of the frame members 65 is provided with a more or less centrally located hole 65a which serves to support one end of an armature shaft 66. The armature shaft 66 supports a pair of armatures 67, each of which is formed by a plurality of laminations held together by rivets 68. Each armature has two salient poles 69 which are positioned the same angular distance apart as the field pole faces 63. The faces of the armature pole 69 are cylindrically curved about the axis on which the armature is pivotally mounted. Clamped in the center of each stack of armature laminations is a substantially T-shaped member 70, the upper end of which forms the above-described drive arm 53. Extending through the armature laminations and the T-shaped member is a hole 71 which receives in press fit relationship therewith a bearing bushing 72. The bushing 72 is received on the armature shaft 66 to support pivotally the armature 67 thereon.

It should be understood that the drive arm 53 extends from the armature 67 along a line which is not an equal angular distance from the armature poles 69. In FIG. 4 of the drawings, the two armatures are shown in their rest positions in which the armature poles 69 are displaced with respect to the field pole faces 63. Upon energization of the field coil 61 by a half wave of alternating current, the armatures are rotated in opposite directions into substantial alignment with the field pole faces. Upon breakdown of the magnetic field produced by the pulse of electricity, the springs associated with each armature and described in detail below will oscillate the armature in the reverse direction, through the neutral or rest position and continuing until the springs arrest the movement of the armature and the succeeding pulse starts the armature moving again toward its position of alignment with the field pole faces. The armature moves a greater angular distance during the power portion of the stroke when it is drawn into alignment with the field poles than it does in the portion of the stroke in which the field is de-energized. As a consequence, the rest position of the armatures 67 is displaced somewhat from the center stroke position. Thus, the drive arms 53, as shown in FIG. 4, are displaced slightly with respect to each other even though the armatures are positioned so that the drive arms will be aligned in their center stroke positions during operation. The oscillation of the armatures 67 in opposite directions causes the cutters 51 to reciprocate in opposite directions. The vibration effects produced by the armatures oscillating in opposite directions and the cutters reciprocating in opposite directions tend to balance out the vibration which might otherwise be noted on the exterior of housing 22.

Since the drive arms on the adjacent armatures are inclined outwardly in opposite directions as may be seen in FIG. 4, it should be appreciated that the armatures and their respective T-shaped members 70 are identical in shape and form and are merely mounted on the armature shaft 66 in reversed relation. The arrangement of the field and the drive arms 53 permitting the use of identical armatures, is, of course, helpful in facilitating assembly of the shavers and in lowering the manufacturing cost.

As is conventional in a vibrator type motor of this type, a tuned spring system is provided to oscillate the armature between pulses by the field. In the instant case, the spring system takes the form of a pair of helical springs 75 which are mounted to engage the drive arms 53 a small distance above their pivotal mounting on the armature shaft 66. For the purpose of supporting the inner ends of the springs 75, spring supporting cups 76 are secured to the drive arms 53 by means of projections 77 which extend into the supporting cups 76 and are staked over therein.

For supporting the outer ends of the spring 75, the frame members 65 are provided at their upper ends with inwardly extending projections 65b to which are secured spring supports 78. The spring supports 78 are generally U-shaped having a connecting portion 78a with parallel spaced ends 78b. The spaced ends 78b are formed with inwardly directed projections 78c which receive the outer ends of springs 75. Thus, each of the four springs 75 is received between one of the spring supporting cups 76 mounted on a drive arm 53 and one of the projections 78c on a spring support 78.

While in most vibrator motors it is possible through careful control of part tolerances to design a motor that may be readily assembled, it has been found that a dual armature vibrator motor using a single field member presents serious problems. Inasmuch as the armatures are essentially in parallel in the magnetic circuit including the field 60, the flux produced by the field should ideally split equally between the two armatures. Any differences between the two armatures or their mounting with respect to the field pole faces 63 may cause an unequal split of the flux between the two armatures. This accordingly results in less power being delivered to one armature than to the other and a shorter stroke by one cutter than the other.

The shorter stroke results in unsatisfactory cutting by one of the heads 45. In the normal displaced, rest position of the armature, it is desirable for the armature poles 69 to barely overlap the field pole faces 63. Any difference in the amount of overlap or the effective air gap for one armature as compared to the other causes the armature with greater overlap or the smaller effective air gap to absorb more of the flux and power than the other armature. Because of the critical nature of the rest position of the armature, it has been found to be necessary to provide for adjustable positioning of the armatures so that difference in rest positions brought about by manufacturing tolerances may be overcome.

To permit adjustable positioning of the armatures, the spring supports 78 are secured to frame members 65 by screws 79 which extend through elongated openings 78d in the spaced ends 78b and are threadedly received in holes 65c in the frame member 65. Thus, by loosening the screws 79, the spring supports 78 may be adjusted to move the spring 75 axially thereby adjusting the rest position of each armature 67.

To enable the worker assembling the motor to establish the proper position for each of the armatures 67, each of the frame members 65 has an observation opening 65d formed therein as is best shown in FIGS. 4 and 7. The opening 65d permits observation of the lower edge of one of the field pole faces 63 and an adjacent portion of one of the armatures 67. The proper rest position for the armature required that the corner of the armature pole 69, as seen through the opening 65d, overlap the adjacent field pole face 63. To aid in establishing the exact position of the armature while making the setting of the spring support 78, a small projection 65e is provided on the edge of the opening 65d. It is intended that the armature pole 69 may then be easily aligned with the projection or indicia pointer 65e. It should be understood that there is an opening 65d in both of the identical frame members 65 thereby permitting both of the armatures 67 to be adjusted to their proper rest positions.

To energize the motor 23, leads 80 are provided which interconnect the terminal pins 27a with the field coil 60. The ends of the leads 80 adjacent the terminal pin assembly 27 are soldered to the terminal pins 27a and clamped to the terminal pin assembly by means of a combined shielding member and strain relief 27b which is made of a suitable insulating material.

The light bulb 36 is supported directly on one of the frame members 65 by means of a stamped bracket 81. The bracket 81 is secured to the frame member 65 by a pair of tabs 65f which extend through openings in the bracket 81 and are deformed to retain the bracket thereon. The bulb 36 is threadedly received in a lamp socket 82 which is secured to the bracket 81. The lamp socket is connected by means of leads 83 to the field coil 60. The lamp leads 83 are connected in series with a number of turns on the field coil to inductively couple the lamp circuit with the motor field coil circuit in a manner well known in the art. It should be appreciated that with the bulb 36 mounted directly on the motor 23, all of the working parts of the shaver may be very easily and simply assembled to the housing 22.

While there has been illustrated and described a particular embodiment of a dry shaver particularly designed for use by women, it will be appreciated that numerous changes and modifications thereof will occur to those skilled in the art and it is intended in the appended claims to cover all those changes and modifications that fall within the true spirit and scope of the present invention.

What is claimed as new and desired to be secured by Letters Patent of the United States is:

1. A motor comprising a vibratory type motor having a pair of armatures mounted for oscillation about a common axis, said motor having a field with two spaced poles, frame means carried by said field and supporting said armatures, spring means biasing said armatures to rest positions in which they are diplaced with respect to said field poles whereby energization of said field causes said armature to rotate in opposite directions into alignment with each other and with said field poles, said spring means being adjustable with respect to said frame means to establish said rest position with said armatures displaced an equal angular amount in opposite directions from an aligned position with respect to said field poles.

2. The motor of claim 1 wherein the spring means for each armature comprises a pair of aligned helical biasing springs mounted in opposed relation having the inner ends thereof acting against a drive arm, a spring support having spaced inwardly facing spring seats receiving the outer ends of said springs, said spring support being adjustably mounted on said frame means whereby said springs may be adjusted axially to vary the rest positions of said armatures.

3. The motor of claim 1 wherein said frame means comprises a pair of non-magnetic plates in spaced parallel relation on either side of said field with said common axis of said armature being perpendicular thereto, an opening being provided in each plate for observation of the armature, and indicia means adjacent said opening for alignment with said armature to obtain said rest positions through adjustment of said spring support.

4. The motor of claim 1 wherein said frame means comprises a pair of plates positioned in spaced parallel relation on either side of said field with said common axis of said armature being perpendicular thereto, said spring means for each armature including a pair of helical biasing springs mounted in opposed relation having the inner ends thereof against a drive arm, a U-shaped spring support having on the legs thereof inwardly facing spring seats receiving the outer ends of said springs, inwardly directed mounting portions on each said plate, and means adjustably mounting said support on said mounting portions whereby said support may be adjusted axially of each said pair of springs to move the rest position of an armature.

References Cited by the Examiner

UNITED STATES PATENTS

| 2,262,392 | 11/1941 | Dalkowitz | 240—2 |
| 2,741,711 | 4/1956 | Meyerink | 310—29 |
| 2,965,748 | 12/1960 | Bonanno | 240—2 |
| 3,105,163 | 9/1963 | Camp | 310—38 X |
| 3,144,571 | 8/1964 | Kukulski | 310—22 X |
| 3,155,855 | 11/1964 | Futterer | 310—38 |

FOREIGN PATENTS 594,770  11/1947  Great Britain.

MILTON O. HIRSHFIELD, *Primary Examiner.*

MYRON C. KRUSE, *Examiner.*

D. F. DUGGAN, *Assistant Examiner.*